US012211280B2

(12) United States Patent
Stewart et al.

(10) Patent No.: US 12,211,280 B2
(45) Date of Patent: Jan. 28, 2025

(54) VISION SYSTEM FOR CLASSIFYING PERSONS BASED ON VISUAL APPEARANCE AND DWELL LOCATIONS

(71) Applicant: Sensormatic Electronics, LLC, Boca Raton, FL (US)

(72) Inventors: Michael C. Stewart, Delray Beach, FL (US); Karthik Jayaraman, Tamil Nadu (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 353 days.

(21) Appl. No.: 17/688,379

(22) Filed: Mar. 7, 2022

(65) Prior Publication Data
US 2023/0281993 A1 Sep. 7, 2023

(51) Int. Cl.
*G06V 20/52* (2022.01)
*G06V 10/764* (2022.01)
(Continued)

(52) U.S. Cl.
CPC .......... *G06V 20/52* (2022.01); *G06V 10/764* (2022.01); *G06V 40/10* (2022.01); *G06V 40/20* (2022.01); *H04N 7/183* (2013.01)

(58) Field of Classification Search
CPC ...... G06V 20/52; G06V 10/764; G06V 40/10; G06V 40/20; G06V 40/103; H04N 7/183
See application file for complete search history.

(56) References Cited

U.S. PATENT DOCUMENTS

| 11,615,623 B2 * | 3/2023 | Khadloya | G06V 10/454 |
| | | | 382/103 |
| 2009/0016599 A1 * | 1/2009 | Eaton | G06N 3/044 |
| | | | 382/159 |

(Continued)

FOREIGN PATENT DOCUMENTS

WO 2022047491 A1 3/2022

OTHER PUBLICATIONS

Yuganthin et al, Activity Tracking of Employees in Industries using Computer Vision, Proceedings of the Fifth International Conference on Trends in Electronics and Informatics (ICOEI), 2021 (Year: 2021).*

(Continued)

*Primary Examiner* — Andrae S Allison
(74) *Attorney, Agent, or Firm* — ArentFox Schiff LLP

(57) ABSTRACT

Example implementations include a method, apparatus and computer-readable medium of computer vision configured for person classification, comprising receiving, during a first period of time, a plurality of image frames of an environment, identifying images of persons from each frame of the plurality of image frames, and determining a respective vector representation of each of the images. The implementations include generating a probability distribution indicative of a likelihood of a particular vector representation appearing in the plurality of image frames and identifying an associate vector representation by sampling the probability distribution using a probability model. The implementations include determining an input vector representation of an input image identified in an image frame depicting a person and received during a second period of time. The implementations include comparing the input vector representation with the associate vector representation and classifying, (Continued)

based on the comparison, the person in the input image as an associate.

19 Claims, 6 Drawing Sheets

(51) Int. Cl.
*G06V 40/10* (2022.01)
*G06V 40/20* (2022.01)
*H04N 7/18* (2006.01)

(56) References Cited

U.S. PATENT DOCUMENTS

| | | | | |
|---|---|---|---|---|
| 2009/0288011 | A1* | 11/2009 | Piran | G06F 3/048 |
| | | | | 715/720 |
| 2010/0066822 | A1* | 3/2010 | Steinberg | G06F 3/04842 |
| | | | | 382/118 |
| 2012/0263433 | A1* | 10/2012 | Mei | G06Q 30/0276 |
| | | | | 386/E5.003 |
| 2015/0279182 | A1 | 10/2015 | Kanaujia et al. | |
| 2018/0139332 | A1* | 5/2018 | Kerzner | G08B 21/0476 |
| 2020/0226416 | A1* | 7/2020 | Bapat | G08B 13/19645 |
| 2022/0067358 | A1* | 3/2022 | Stewart | G06F 18/214 |

OTHER PUBLICATIONS

Topkaya et al, Counting People by Clustering Person Detector Outputs, 11th IEEE International Conference on Advanced Video and Signal Based Surveillance (AVSS), 2014 (Year: 2014).*

John, V., Englebienne, G., & Krose, B.. Solving Person Re-identification in Nonoverlapping Camera using Efficient Gibbs Sampling. In T. Burghardt, D. Damen, W. Mayol-Cuevas, & M. Mirmehdi (Eds.), Proceedings of the British Machine Vision Conference: BMVC, 2013: Bristol, Sep. 9-13 (pp. 55.1-55.11 (Year: 2013).*

International Search Report in PCT/US2023/062744, mailed May 8, 2023, 6 pages.

Saleemi et al., "Probabilistic Modeling of Scene Dynamics for Applications in Visual Surveillance," IEEE Transactions on Pattern Analysis and Machine Intelligence, Aug. 2009, vol. 31, No. 8, pp. 1472-1485.

* cited by examiner

VISION SYSTEM FOR CLASSIFYING PERSONS BASED ON VISUAL APPEARANCE AND DWELL LOCATIONS

TECHNICAL FIELD

The described aspects relate to security systems.

BACKGROUND

Aspects of the present disclosure relate generally to security systems, and more particularly, to a vision system configured to classify persons based on visual appearance and dwell locations.

In certain environments such as stores, restaurants, offices, etc., associates wear a uniform to distinguish themselves from visitors (e.g., customers). Associates are given access privileges such as the right to enter "staff-only" zones. If a visitor enters such areas of the environment, there is a chance that the visitor intends to perform a crime (e.g., theft, vandalism, etc.). Conventional security systems in these environments normally include a camera system that alerts a system administrator (e.g., a guard or a manager) when motion is detected in a given zone. To reduce the amount of alerts generated by the camera, some "smart" security systems analyze frames to determine whether the motion is associated with a person that is an associate or a visitor.

Unfortunately, creating and setting up a security system with object detection capabilities is difficult. If the security system relies on a machine learning algorithm that is pre-trained to identify a particular uniform, the effectiveness of the security system will be limited to environments that use that particular uniform. If a machine learning algorithm is programmable by a system administrator (e.g., the system administrator may manually generate a training dataset by tagging associates and non-associates), the setup becomes lengthy, cumbersome, and prone to human error. Here, the quality of the machine learning algorithm becomes dependent on how well the system administrator, who may be unfamiliar with technology, generates the training dataset.

Conventional security systems are unable to address these issues. Accordingly, there exists a need for improvements in such security systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of computer vision including person classification, comprising receiving, during a first period of time, a plurality of image frames from a camera monitoring an environment. The method further includes identifying images of persons from each frame of the plurality of image frames. Additionally, the method further includes determining a respective vector representation of each of the images. Additionally, the method further includes generating a probability distribution indicative of a likelihood of a particular vector representation appearing in the plurality of image frames. Additionally, the method further includes identifying an associate vector representation by sampling the probability distribution using a probability model, wherein the associate vector representation is a vector representation that appears most often in the plurality of image frames. Additionally, the method further includes receiving an image frame from the camera during a second period of time. Additionally, the method further includes determining an input vector representation of an input image identified in the image frame, wherein the input image depicts a person. Additionally, the method further includes comparing the input vector representation with the associate vector representation. Additionally, the method further includes classifying the person in the input image as an associate in response to determining, based on the comparing, that the associate vector representation corresponds to the input vector representation.

Another example aspect includes an apparatus for computer vision including person classification, comprising a memory and a processor communicatively coupled with the memory. The processor is configured to receive, during a first period of time, a plurality of image frames from a camera monitoring an environment. The processor is further configured to identify images of persons from each frame of the plurality of image frames. Additionally, the processor further configured to determine a respective vector representation of each of the images. Additionally, the processor further configured to generate a probability distribution indicative of a likelihood of a particular vector representation appearing in the plurality of image frames. Additionally, the processor further configured to identify an associate vector representation by sampling the probability distribution using a probability model, wherein the associate vector representation is a vector representation that appears most often in the plurality of image frames. Additionally, the processor further configured to receive an image frame from the camera during a second period of time. Additionally, the processor further configured to determine an input vector representation of an input image identified in the image frame, wherein the input image depicts a person. Additionally, the processor further configured to compare the input vector representation with the associate vector representation. Additionally, the processor further configured to classify the person in the input image as an associate in response to determining, based on the comparing, that the associate vector representation corresponds to the input vector representation.

Another example aspect includes an apparatus for computer vision including person classification, comprising means for receiving, during a first period of time, a plurality of image frames from a camera monitoring an environment. The apparatus further includes means for identifying images of persons from each frame of the plurality of image frames. Additionally, the apparatus further includes means for determining a respective vector representation of each of the images. Additionally, the apparatus further includes means for generating a probability distribution indicative of a likelihood of a particular vector representation appearing in the plurality of image frames. Additionally, the apparatus further includes means for identifying an associate vector representation by sampling the probability distribution using a probability model, wherein the associate vector representation is a vector representation that appears most often in the plurality of image frames. Additionally, the apparatus further includes means for receiving an image frame from the camera during a second period of time. Additionally, the apparatus further includes means for determining an input vector representation of an input image identified in the image frame, wherein the input image depicts a person. Additionally, the apparatus further includes means for comparing the input vector representation with the associate vector representation. Additionally, the apparatus further includes means for classifying the person in the input image as an associate in response to determining, based on the comparing, that the associate vector representation corresponds to the input vector representation.

Another example aspect includes a computer-readable medium storing instructions for computer vision including person classification, wherein the instructions are executable by a processor to receive, during a first period of time, a plurality of image frames from a camera monitoring an environment. The instructions are further executable to identify images of persons from each frame of the plurality of image frames. Additionally, the instructions are further executable to determine a respective vector representation of each of the images. Additionally, the instructions are further executable to generate a probability distribution indicative of a likelihood of a particular vector representation appearing in the plurality of image frames. Additionally, the instructions are further executable to identify an associate vector representation by sampling the probability distribution using a probability model, wherein the associate vector representation is a vector representation that appears most often in the plurality of image frames. Additionally, the instructions are further executable to receive an image frame from the camera during a second period of time. Additionally, the instructions are further executable to determine an input vector representation of an input image identified in the image frame, wherein the input image depicts a person. Additionally, the instructions are further executable to compare the input vector representation with the associate vector representation. Additionally, the instructions are further executable to classify the person in the input image as an associate in response to determining, based on the comparing, that the associate vector representation corresponds to the input vector representation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that provide a self-learning security system that classifies persons based on their visual appearance, such as but not limited to a uniform, and dwell locations. The self-learning security system can be set up faster and without human error, unlike conventional security systems.

Figure 1:
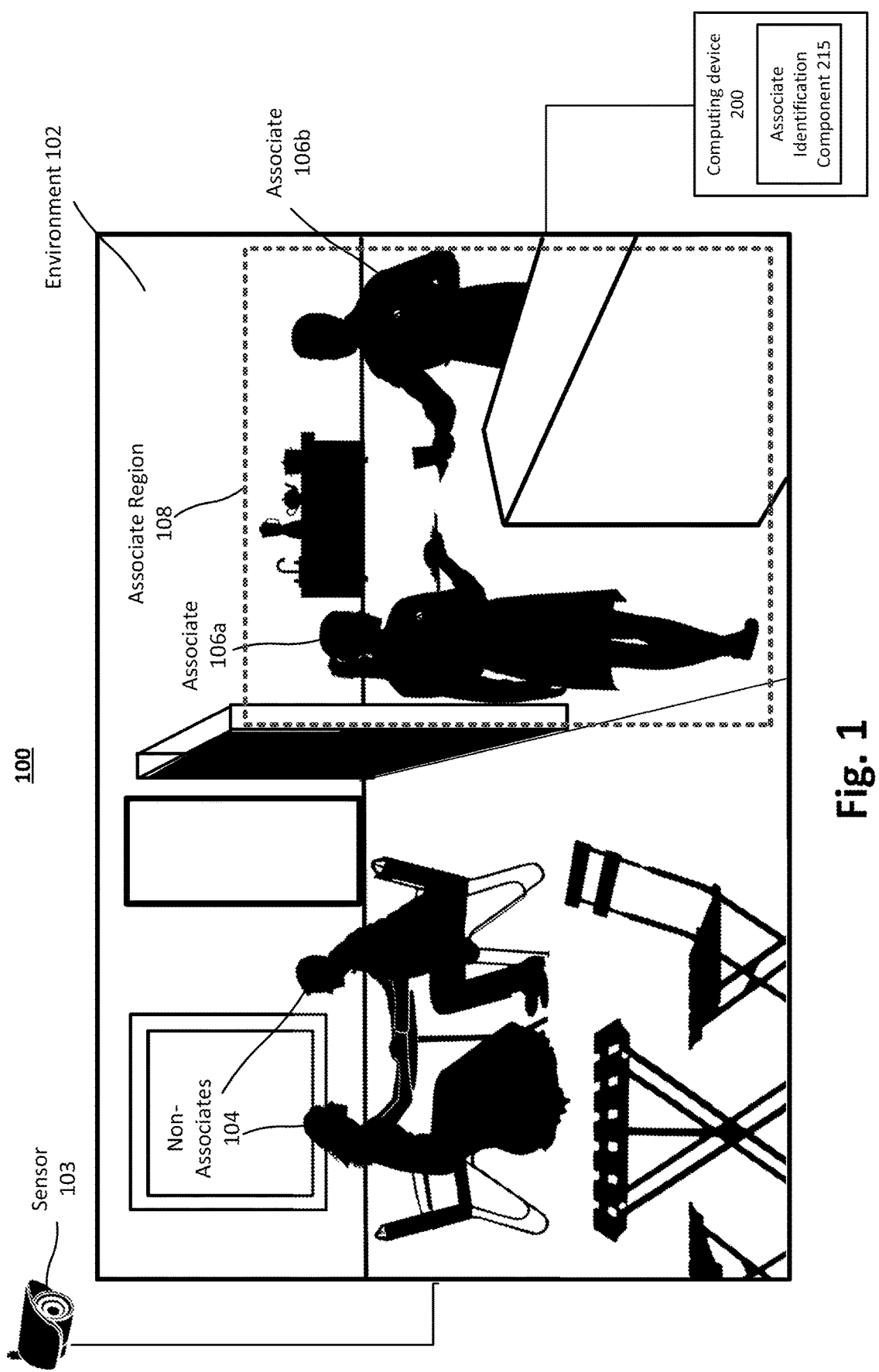
FIG. 1 is a diagram of an image frame depicting an environment with associates and non-associates, in accordance with exemplary aspects of the present disclosure.

FIG. 1 is a diagram of image frame 100 captured by a sensor 103 and depicting environment 102 with associates 106 and non-associates 104 that can be identified by an associate identification component 215 of a computer device 200, in accordance with exemplary aspects of the present disclosure. mage frame 100 may be captured, for example, by a camera that is fixed in environment 102. Image frame 100 may be one of a plurality of image frames provided by said camera. For example, the camera may be a security camera that captures a video stream comprising the plurality of image frames.

An "environment," in the context of the present disclosure, may be any physical location in which two groups of people can be found: non-associates and associates. Further to the above definition, an associate may be a person that regularly appears in environment 102 and is linked with (e.g., by a contract) the environment as an employee, contractor, owner, etc. Associates may have certain privileges that non-associates are not granted. For example, an associate may be allowed to enter a particular area of the environment (e.g., a staff room). Also, further to the above definition, a non-associate may be a visitor that is not linked with the environment, e.g., by a contract. For example, a non-associate may be a customer or a client. In the illustrated example, environment 102 is a restaurant, but other examples of an environment may be, but are not limited to, a retail store, an office, a warehouse, a school, etc.

A workflow of the present disclosure may include receiving image frame 100 from a camera, locating and extracting images of people from the frame, tracking between frames to remove duplicates, and converting the extracted images of people to a vector space. Here, a vector embedding translates images of people into a vector space where they can be mathematically compared to each other by similarity of appearance. To distinguish between associates and non-associates, an associate appearance within the vector space is modelled using a probabilistic method. Conventional systems use a traditional machine learning model for modelling, which requires labor-intensive training and limits scope to, for example, camera view angles, camera lens types, lighting conditions, and uniform appearances. The probabilistic method of the present disclosure does not have the overhead issues of a machine learning model and is easily scaled.

The probabilistic method of the present disclosure is backed by certain high-level assumptions about environments and human behavior. These assumptions include: associates spend a significant time within the camera view, associates wear some type of uniform (e.g., one or more clothing items) and/or other identifier (e.g., name badge, company logo) that makes them more visually consistent than non-associates, and associates dwell within some common location within the camera view. Referring to FIG. 1, four people are captured in image frame 100. Associate 106$a$ and associate 106$b$ (e.g., waiters) may thus be classified as associates because they appear in more image frames than any other person (e.g., non-associates 104 may be customers that exit the frame after a period of time), have similar uniforms, and tend to dwell in associate region 108 (e.g., a kitchen area open only to staff). The present disclosure, based on the above-described probabilistic method that takes into account the visual appearance and dwell times of identified persons, enables automatic identification/classification of associates 106 without needing to train a machine learning model.

Figure 2:
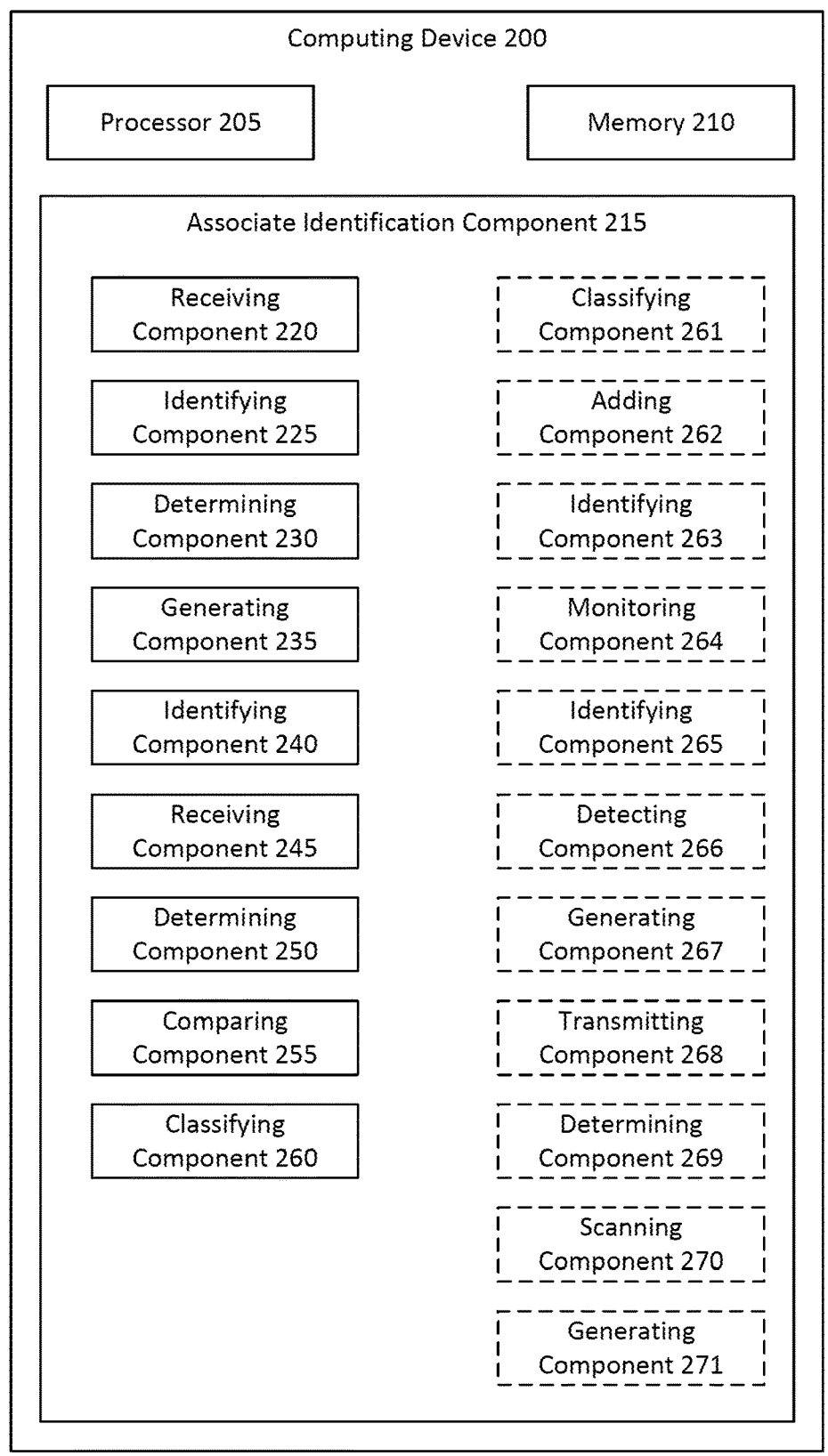
FIG. 2 is a block diagram of a computing device executing an associate identification component, in accordance with exemplary aspects of the present disclosure.
Figure 3:
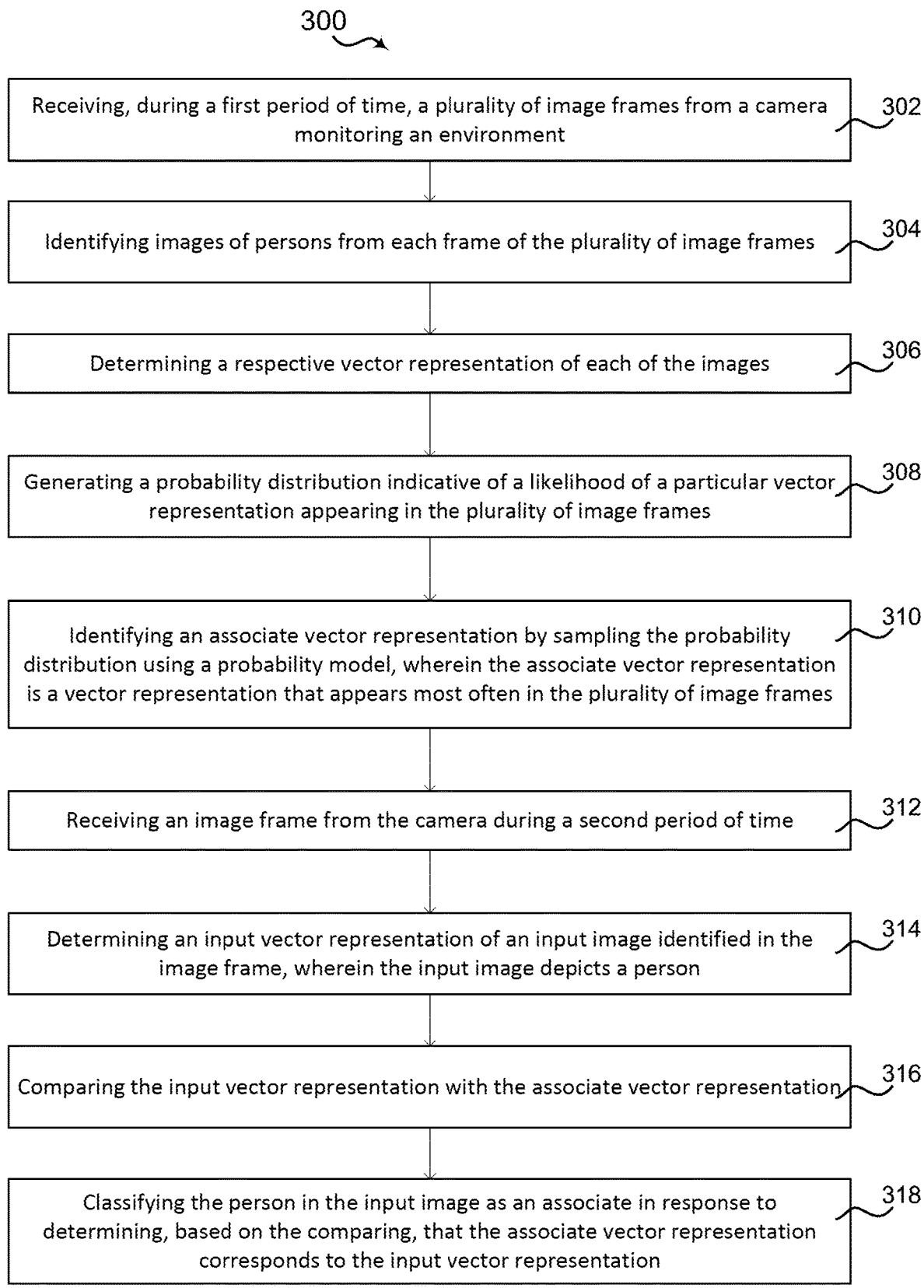
FIG. 3 is a flowchart illustrating a method of classifying persons based on visual appearance, in accordance with exemplary aspects of the present disclosure.

Referring to FIG. 2 and FIG. 3, in operation, computing device 200 may perform a method 300 of computer vision including person classification, by such as via execution of associate identification component 215 by processor 205 and/or memory 210. More specifically, FIG. 3 is a flowchart illustrating method 300 of classifying persons based on visual appearance, in accordance with exemplary aspects of the present disclosure.

At block 302, the method 300 includes receiving, during a first period of time, a plurality of image frames from a camera monitoring an environment. For example, in an aspect, computing device 200, processor 205, memory 210, associate identification component 215, and/or receiving component 220 may be configured to or may comprise means for receiving, during a first period of time, a plurality of image frames from a camera monitoring environment 102. For instance, the computer device 200 may receive the plurality of image frames via a wired and/or wireless connection from one or more sensors 103, such as video cameras, in the environment 102. The wired and/or wireless connection may be via one or more local communication links, or one or more remote communication links, or some combination thereof.

The first period of time represents a warm-up period during which image frames from one or more camera views are analyzed. As mentioned previously, no human interaction is required (e.g., no manual labelling or input needed). After the warm-up period, each person track is observed against an associate vector representation (comprising appearance information) to infer if the person is an associate. It should be noted that the associate vector representation may be updated even after the warm-up period-albeit at a slower pace. In particular, the probabilistic method involves creating a model within the vector space. There is a chain of processing where: first, persons are detected, their appearance in the image is converted into the vector space, and then a probabilistic model decides where in that vector space each individual is an associate or not. As the model updates, the associate vector representation "moves around" within the vector space.

It should be noted that there may be multiple cameras in environment 102, each providing a different view of environment 102. In the present disclosure, the camera-level is considered "low-level." This means that higher-performance models are customized for the view of each respective view. The output from associate identification component 215, for each camera, is an associate track log (indicates where the associate was located in a set of image frames), a non-associate track log (indicates where the associate was located in a set of image frames), associate uniformity (a value indicating how similar associates look visually), an associate vector representation (indicating an average visual appearance of an associate), and an associate-customer ratio. Aggregate modeling and analysis between cameras or sites may be performed by computing device 200 (e.g., a server in the cloud). In some aspects, onsite cameras may share their outputs to cover locations where conditions do not follow the assumptions discussed previously.

At block 304, the method 300 includes identifying images of persons from each frame of the plurality of image frames. For example, in an aspect, computing device 200, processor 205, memory 210, associate identification component 215, and/or identifying component 225 may be configured to or may comprise means for identifying images of persons from each frame of the plurality of image frames. For example, from an image frame, identifying component 225 may identify a set of pixels that includes associate 106$a$ using an object detection algorithm configured to detect persons. The set may be a first image. Identifying component 225 may further identify another set of pixels that includes associate 106$b$. The another set may be a second image.

At block 306, the method 300 includes determining a respective vector representation of each of the images. For example, in an aspect, computing device 200, processor 205, memory 210, associate identification component 215, and/or determining component 230 may be configured to or may comprise means for determining a respective vector representation of each of the images. For example, the vector representation may be an array of quantitative values that represent the contents of an image. In some aspects, each value in the vector representation corresponds to a pixel value in the image.

At block 308, the method 300 includes generating a probability distribution indicative of a likelihood of a particular vector representation appearing in the plurality of image frames. For example, in an aspect, computing device 200, processor 205, memory 210, associate identification component 215, and/or generating component 235 may be configured to or may comprise means for generating a probability distribution indicative of a likelihood of a particular vector representation appearing in the plurality of image frames. In an optional aspect, the probability distribution is one of a beta-binomial distribution, a normal distribution, a Bernoulli distribution:

$$\alpha = p(\text{person\_vector}|\text{is\_associate}) \sim \text{Normal}$$

$$b = p(\text{is\_associate}) \sim \text{Bernoulli}$$

$\alpha$ is parameterized by a mean and covariance matrix. Here, the mean represents a typical appearance of an associate, the covariance represents how uniform is the associate appearance. In terms of $\alpha$, the probability of various person-vectors-given that the person is an associate—is modelled as a Normal distribution." In terms of b the probability that anyone is an associate or not-given no additional information—is modelled as a Bernoulli distribution (e.g., coin flip with probability not necessarily equal to 0.5)." Consider the following example model output:

105 associates. 1696 customers. b=0.0573
    model using k=200 history mean associate time within frame: 6.43 seconds
mean associate position within frame: (519,405)
"α", as a multivariate Normal Distribution, is defined by a mean and covariance:
Associate person-vector mean:
array ([0.2414157, 0.27693105, 0.07047254, −0.55052154, −0.24747855,
  0.36588559, −0.19367953, −0.41737899, −0.21618339, −0.01760098,
  0.16540298, −0.25729252, −0.11006325, −0.11496278, 0.12616482,
  0.59689164, 0.25972087, −0.27126135, 0.01438839, 0.10887077,
  0.02815425, 0.30266439, −0.09285039, 0.1622767, 0.39403023,
  0.13983458, −0.08355272, 0.34549234, −0.01638771, 0.16728859,
  0.18174204, −0.11714321, −0.12322566, −0.0720615, −0.0563051,
  0.00703893, −0.03906195, 0.10548364, . . . ])
Associate person-vector covariance:
array ([[4.54139632e-02, −1.40700214e-04, 6.95757452e-03, . . . ,
  1.21160966e-02, −9.83497390e-03, −1.78187388e-02],
  [−1.40700214e-04, 6.63938516e-02, −1.86935099e-02, . . . ,
  8.07362412e-03, 1.04504170e-02, −1.06606233e-02],
  [6.95757452e-03, −1.86935099e-02, 5.58129696e-02, . . . ,
  1.12210167e-02, −2.87917737e-03, −4.71380455e-03], . . . ])

At block 310, the method 300 includes identifying an associate vector representation by sampling the probability distribution using a probability model, wherein the associate vector representation is a vector representation that appears most often in the plurality of image frames. For example, in an aspect, computing device 200, processor 205, memory 210, associate identification component 215, and/or identifying component 240 may be configured to or may comprise means for identifying an associate vector representation by sampling the probability distribution using a probability model, wherein the associate vector representation is a vector representation that appears most often in the plurality of image frames. In an optional aspect, the probability model (e.g., a Markov chain Monte Carlo (MCMC) model) is learned using a MCMC process.

Under the MCMC process, only appearance is used to identify associates. The associate vector representation is updated with new observations over time. Once the associate appearance is known, associated dwell locations may be determined.

In an optional aspect, the probability distribution is further indicative of a likelihood of a particular vector representation appearing in a location in the plurality of image frames, and wherein the associate vector representation is a vector representation that appears most often in the plurality of image frames at a particular location. In this optional aspect, the probability model (e.g., a Gibbs sampling model) is learned using Gibbs sampling.

Under the Gibbs sampling process, the knowledge of both associate appearance and dwell locations is used to identify associates. The associate vector representation and dwell locations are updated with new observations over time.

In an optional aspect, the probability model is a variational inference model.

In some aspects, associate identification component 215 may convert the associate vector representation to a composite image or representation. Thus, a user of associate identification component 215 may visualize what is identified as an associate uniform. For example, the composite image corresponding to the associate vector representation may depict a vest and slacks that all waiters in environment 102 wear. Users of associate identification component 215 may thus be able to check components included in the uniform (e.g., vest, shirt, hat, etc.).

At block 312, the method 300 includes receiving an image frame from the camera during a second period of time. For example, in an aspect, computing device 200, processor 205, memory 210, associate identification component 215, and/or receiving component 245 may be configured to or may comprise means for receiving image frame 100 from the camera during a second period of time (e.g., after the warm-up period).

At block 314, the method 300 includes determining an input vector representation of an input image identified in the image frame, wherein the input image depicts a person. For example, in an aspect, computing device 200, processor 205, memory 210, associate identification component 215, and/or determining component 250 may be configured to or may comprise means for determining an input vector representation of an input image identified in the image frame, wherein the input image depicts a person.

For example, the input vector representation of associate 106a may be:
vector1=<−0.01709561, 0.25921793, 0.02085397, −0.80950357, −0.41381215,
  −0.53287436, −0.21870645, −0.32251878, −0.2971516, 0.21072237,
  0.5725753, −0.18750807, −0.02569683, −0.22529254, 0.16794605,
  0.32622653, 0.03129758, −0.37135341, −0.09080794, 0.2744315,
  −0.21090447, −0.00820674, −0.01463892, 0.38214556, 0.22252522,
  −0.03881913, −0.40242936, 0.32366654, −0.21771566, 0.0311508,
  −0.02655836, −0.19983707, −0.1462601, 0.04625962, 0.04171272,
  . . . >

At block 316, the method 300 includes comparing the input vector representation with the associate vector representation. For example, in an aspect, computing device 200, processor 205, memory 210, associate identification component 215, and/or comparing component 255 may be configured to or may comprise means for comparing the input vector representation with the associate vector representation.

For example, the associate vector representation may be vector2=<−0.01819161, 0.35921793, 0.01085397, −0.70950357, −0.41381212,
  −0.53207436, −0.22870645, −0.31251878, −0.2921516, 0.21092237,
  0.5825753, −0.18740807, −0.02569683, −0.32529254, 0.126794605,
  0.22622653, 0.13129758, −0.36135341, −0.09180794, 0.2144315,
  −0.22090447, −0.00820675, −0.01463893, 0.38224556, 0.23352522,
  −0.04881913, −0.40142936, 0.31366654, −0.22771566, 0.1311508,
  −0.12655836, −0.19983707, −0.1463601, 0.04625062, 0.14171272,
  . . . >

Comparing component 255 may use a distance function to determine a distance between the respective vectors. If the determined distance (e.g., 2) is less than a threshold distance (e.g., 3), comparing component 255 may determine that the input vector representation corresponds to the associate vector representation. If the determined distance is not less than the threshold distance, comparing component 255 may determines that the input vector representation does not correspond to the associate vector representation.

At block 318, the method 300 includes classifying the person in the input image as an associate in response to determining, based on the comparing, that the associate vector representation corresponds to the input vector representation. For example, in an aspect, computing device 200, processor 205, memory 210, associate identification component 215, and/or classifying component 260 may be configured to or may comprise means for classifying the person in the input image as an associate in response to determining, based on the comparing, that the associate vector representation corresponds to the input vector representation.

For example, if given an input image of associate 106a in image frame 100, classifying component 260 may classify associate 106a as an associate because the distance between the respective vector representations is less than a threshold distance.

In some aspects, associate identification component 215 may execute a function to classify a person as an associate or a non-associate. The function may be: def is_associate (personTrack):
   Return tuple ({"associate", "customer", "learning"}, {confidence, warm-up completion})
      "associate" and confidence if given personTrack is a retail associate
      "non-associate" and confidence if personTrack is a non-associate
      "learning" and completion if models are still being initialized
   personTrack may be a Dict, Pandas Series, or DataFrame
   personTrack must contain:
      'personId'—an integer ID provided by a person tracking algorithm
      'personVector'—a high-dimensional REiD appearance vector representation
      'bbox'-a location within a camera frame
      'cameraId'—a unique camera identifier
   Raise TypeError if personTrack is not a supported format FIG. 4 is a flowchart illustrating a method of classifying persons as non-associates, in accordance with exemplary aspects of the present disclosure.

Figure 4:
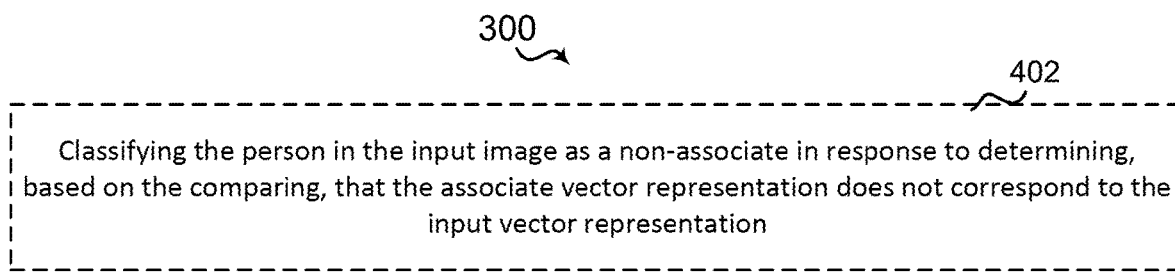
FIG. 4 is a flowchart illustrating a method of classifying persons as non-associates, in accordance with exemplary aspects of the present disclosure.

Referring to FIG. 4, in an optional aspect, at block 402, the method 300 may further include classifying the person in the input image as a non-associate in response to determining, based on the comparing, that the associate vector representation does not correspond to the input vector representation. For example, in an aspect, computing device 200, processor 205, memory 210, associate identification component 215, and/or classifying component 261 may be configured to or may comprise means for classifying the person in the input image as a non-associate in response to determining, based on the comparing, that the associate vector representation does not correspond to the input vector representation.

For example, if given input images of non-associates 104, classifying component 261 may classify both persons as non-associates because the distance between the respective vector representations will be greater than a threshold distance.

Figure 5:
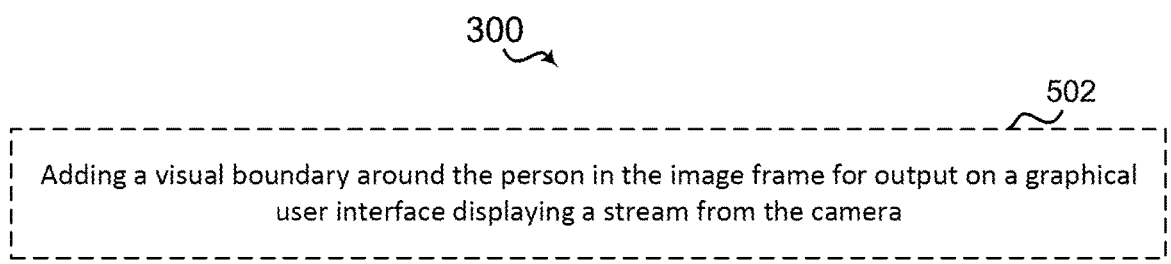
FIG. 5 is a flowchart illustrating a method of generating a visual boundary, in accordance with exemplary aspects of the present disclosure.

FIG. 5 is a flowchart illustrating a method of generating a visual boundary, in accordance with exemplary aspects of the present disclosure.

Referring to FIG. 5, in an optional aspect, at block 502, the method 300 may further include adding a visual boundary around the person in the image frame for output on a graphical user interface displaying a stream from the camera. For example, in an aspect, computing device 200, processor 205, memory 210, associate identification component 215, and/or adding component 262 may be configured to or may comprise means for adding a visual boundary around the person in the image frame for output on a graphical user interface displaying a stream from the camera.

For example, subsequent to classifying a person in an image frame as an associate or a non-associate, adding component 262 may generate a boundary around the person on the image frame. The boundary may be a transparent shape with a line that surrounds the person (e.g., a rectangle). Accordingly, if a user is reviewing security footage, each frame of the footage may include a visual classification of the persons for easier tracking.

Figure 6:
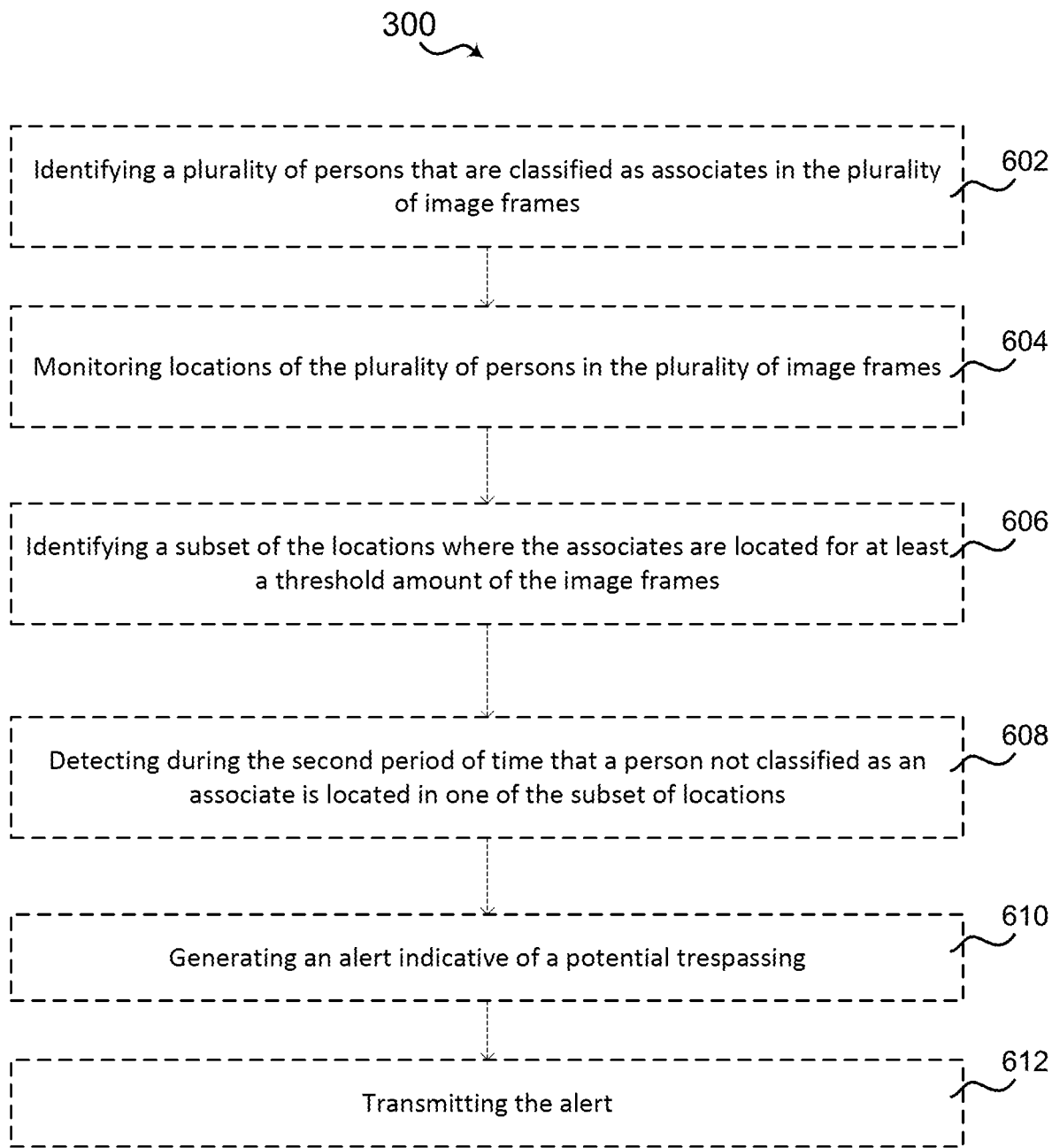
FIG. 6 is a flowchart illustrating a method of detecting trespassing, in accordance with exemplary aspects of the present disclosure.

FIG. 6 is a flowchart illustrating a method of detecting trespassing, in accordance with exemplary aspects of the present disclosure.

Referring to FIG. 6, in an optional aspect, at block 602, the method 300 may further include identifying a plurality of persons that are classified as associates in the plurality of image frames. For example, in an aspect, computing device 200, processor 205, memory 210, associate identification component 215, and/or identifying component 263 may be configured to or may comprise means for identifying a plurality of persons that are classified as associates in the plurality of image frames. For example, identifying component 263 may identify associate 106a and associate 106b in the plurality of frames.

In this optional aspect, at block 604, the method 300 may further include monitoring locations of the plurality of persons in the plurality of image frames. For example, in an aspect, computing device 200, processor 205, memory 210, associate identification component 215, and/or monitoring component 264 may be configured to or may comprise means for monitoring locations of the plurality of persons in the plurality of image frames.

For example, monitoring component 264 may determine a portion of each frame that associates 106 are located in. In some cases, associates 106 may move to areas where non-associates are located. However, associates tend to dwell in certain areas such as point-of-sale locations (e.g., behind a cash register desk) where non-associates do not enter. In environment 102, one such area is associate region 108, which may be a kitchen area.

In this optional aspect, at block 606, the method 300 may further include identifying a subset of the locations where the associates are located for at least a threshold amount of the image frames. For example, in an aspect, computing device 200, processor 205, memory 210, associate identification component 215, and/or identifying component 265 may be configured to or may comprise means for identifying a subset of the locations where the associates are located for at least a threshold amount of the image frames.

For example, each location may be represented by a boundary box of a particular height, width, and center point. Identifying component 265 may work on a pixel-level and identify a plurality of pixels across the plurality of image frames where a location has been marked in at least a threshold amount of the image frames (e.g., 85% of frames). For example, from 1000 frames, 1000 locations of associates 106 may be identified. Each location has an associated set of pixels. On a pixel-level, a particular pixel may be a part of 900 locations. Because 900 exceeds 850 (i.e., 85% of 1000), the pixel is included in the subset of locations. For example, associate region 108 may be part of the subset of locations and is made up of a plurality of pixels that have appeared in at least 85% of the plurality of image frames.

In some aspects, the dwell locations can be used to determine a state of the camera. For example, a sudden change in dwell locations may be indicative of a camera being moved/shifted, a view being obstructed of the camera, or a floor layout being changed. Subsequent to the subset of locations being determined, identifying component 265 may monitor for changes in location (e.g., for a next set of frames, the associates are present in the subset of locations for less than the threshold amount of frames). If the change is drastic (e.g., appearing for 90% of frames in a first plurality and only 40% in a second plurality—i.e., a difference of 50%), identifying component 265 may generate an alert for inspection. For example, associate identification component 215 may generate a notification on a graphical user interface of a security system that requests that the camera be checked and that obstructions be moved.

In another aspect, the dwell locations may be used to detect trespassing or a theft attempt. For example, at block 608, the method 300 may further include detecting during the second period of time that a person not classified as an associate is located in one of the subset of locations. For example, in an aspect, computing device 200, processor 205, memory 210, associate identification component 215, and/or detecting component 266 may be configured to or may comprise means for detecting during the second period of time that a person not classified as an associate is located in one of the subset of locations. For example, one of non-associates 104 may enter associate region 108 to steal money.

In this optional aspect, at block 610, the method 300 may further include generating an alert indicative of a potential trespassing. For example, in an aspect, computing device 200, processor 205, memory 210, associate identification component 215, and/or generating component 267 may be configured to or may comprise means for generating an alert indicative of a potential trespassing.

For example, the alert may be a notification generated on a graphical user interface of a security system that depicts the output of the cameras in environment 102. The alert may be a text message or an email that is transmitted to a user (e.g., a security guard of environment 102). The alert may be a command that controls a sensor in environment 102.

In this optional aspect, at block 612, the method 300 may further include transmitting the alert. For example, in an aspect, computing device 200, processor 205, memory 210, associate identification component 215, and/or transmitting component 268 may be configured to or may comprise means for transmitting the alert. For example, an alert that is a command may be transmitted to a lighting device to flash lights or to a speaker to output a siren/alarm. In another example, an alert that is an email/text may be sent to the designated recipient.

Figure 7:
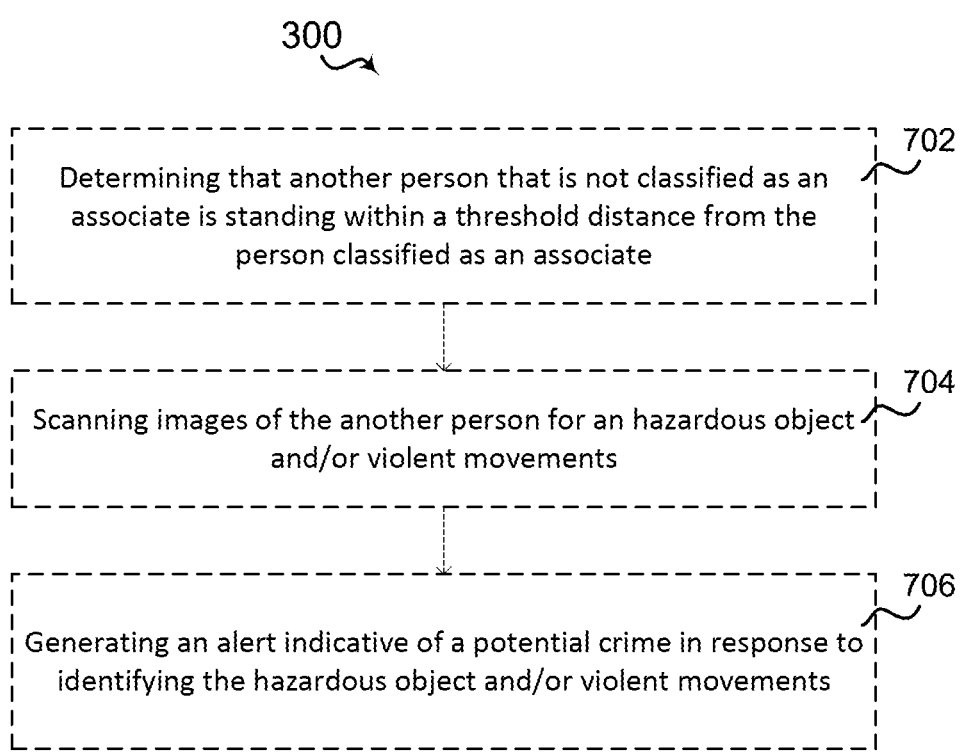
FIG. 7 is a flowchart illustrating a method of detecting a potential crime, in accordance with exemplary aspects of the present disclosure.

FIG. 7 is a flowchart illustrating a method of detecting a potential crime, in accordance with exemplary aspects of the present disclosure.

Referring to FIG. 7, in an optional aspect, at block 702, the method 300 may further include determining that another person that is not classified as an associate is standing within a threshold distance from the person classified as an associate. For example, in an aspect, computing device 200, processor 205, memory 210, associate identification component 215, and/or determining component 269 may be configured to or may comprise means for determining that another person that is not classified as an associate is standing within a threshold distance from the person classified as an associate.

For example, determining component 269 may monitor and continuously/periodically calculate distances between classified persons. Suppose that the threshold distance is 0.5 meters. Determining component 269 may calculate that the distance between associate 106a and non-associates 104 is 0.4 meters.

In this optional aspect, at block 704, the method 300 may further include scanning images of the another person for an hazardous object and/or violent movements. For example, in an aspect, computing device 200, processor 205, memory 210, associate identification component 215, and/or scanning component 270 may be configured to or may comprise means for scanning images of the another person for an hazardous object and/or violent movements.

For example, in response to determining that the distance between associate 106a and non-associates 104 is less than the threshold distance, scanning component 270 may execute computer vision techniques such as object detection to search for pre-determined hazardous objects. Such objects include, but are not limited to, a gun, a knife, scissors, etc. Scanning component 270 may also analyze the image frames capturing the interaction between non-associates 104 and associate 106a to determine whether a violent movement is detected. For example, a machine learning model that classifies whether a movement is violent (e.g., the use of a knife or a gun) may be employed by scanning component 270.

In this optional aspect, at block 706, the method 300 may further include generating an alert indicative of a potential crime in response to identifying the hazardous object and/or violent movements. For example, in an aspect, computing device 200, processor 205, memory 210, associate identification component 215, and/or generating component 271 may be configured to or may comprise means for generating an alert indicative of a potential crime in response to identifying the hazardous object and/or violent movements.

For example, scanning component 270 may either receive an indication from the machine learning model that a violent movement is detected (e.g., a non-associate has made a punching motion) or may detect using an object detection model that a hazardous object is present. If either criterion is fulfilled, generating component 271 may generate an alert (e.g., a notification, text, email, command, etc.).

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of computer vision including person classification, comprising:
receiving, during a first period of time, a plurality of image frames from a camera monitoring an environment;
identifying images of persons from each frame of the plurality of image frames;
determining a respective vector representation of each of the images;
generating a probability distribution indicative of a likelihood of a particular vector representation appearing in the plurality of image frames;
identifying an associate vector representation by sampling the probability distribution using a probability model, wherein the associate vector representation is a vector representation that appears most often in the plurality of image frames;
receiving an image frame from the camera during a second period of time;
determining an input vector representation of an input image identified in the image frame, wherein the input image depicts a person;
comparing the input vector representation with the associate vector representation; and
classifying the person in the input image as an associate in response to determining, based on the comparing, that the associate vector representation corresponds to the input vector representation.

2. The method of claim 1, further comprising:
classifying the person in the input image as a non-associate in response to determining, based on the comparing, that the associate vector representation does not correspond to the input vector representation.

3. The method of claim 1, further comprising:
adding a visual boundary around the person in the image frame for output on a graphical user interface displaying a stream from the camera.

4. The method of claim 1, wherein the probability distribution is one of a beta-binomial distribution, a normal distribution, and a Bernoulli distribution, and the probability model is learned using Markov chain Monte Carlo (MCMC) processing.

5. The method of claim 1, further comprising:
identifying a plurality of persons that are classified as associates in the plurality of image frames;
monitoring locations of the plurality of persons in the plurality of image frames; and
identifying a subset of the locations where the associates are located for at least a threshold amount of the image frames.

6. The method of claim 5, further comprising:
detecting during the second period of time that a person not classified as an associate is located in one of the subset of locations;
generating an alert indicative of a potential trespassing; and
transmitting the alert.

7. The method of claim 1, wherein the probability distribution is further indicative of a likelihood of a particular vector representation appearing in a location in the plurality of image frames, and wherein the associate vector representation is a vector representation that appears most often in the plurality of image frames at a particular location.

8. The method of claim 7, wherein the probability model is learned using Gibbs sampling.

9. The method of claim 1, further comprising:
determining that another person that is not classified as an associate is standing within a threshold distance from the person classified as an associate;
scanning images of the another person for an hazardous object and/or violent movements; and
generating an alert indicative of a potential crime in response to identifying the hazardous object and/or violent movements.

10. An apparatus for computer vision including person classification, comprising:
a memory; and
a processor communicatively coupled with the memory and configured to:
receive, during a first period of time, a plurality of image frames from a camera monitoring an environment;
identify images of persons from each frame of the plurality of image frames;
determine a respective vector representation of each of the images;
generate a probability distribution indicative of a likelihood of a particular vector representation appearing in the plurality of image frames;
identify an associate vector representation by sampling the probability distribution using a probability model, wherein the associate vector representation is a vector representation that appears most often in the plurality of image frames;
receive an image frame from the camera during a second period of time;
determine an input vector representation of an input image identified in the image frame, wherein the input image depicts a person;
compare the input vector representation with the associate vector representation; and
classify the person in the input image as an associate in response to determining, based on the comparing, that the associate vector representation corresponds to the input vector representation.

11. The apparatus of claim 10, wherein the processor is further configured to:
classify the person in the input image as a non-associate in response to determining, based on the comparing, that the associate vector representation does not correspond to the input vector representation.

12. The apparatus of claim 10, wherein the processor is further configured to:
add a visual boundary around the person in the image frame for output on a graphical user interface displaying a stream from the camera.

13. The apparatus of claim 10, wherein the probability distribution is one of a beta-binomial distribution, a normal distribution, and a Bernoulli distribution, and the probability model is learned using Markov chain Monte Carlo (MCMC) processing.

14. The apparatus of claim 10, wherein the processor is further configured to:
identify a plurality of persons that are classified as associates in the plurality of image frames;
monitor locations of the plurality of persons in the plurality of image frames; and
identify a subset of the locations where the associates are located for at least a threshold amount of the image frames.

15. The apparatus of claim 14, wherein the processor is further configured to:

detect during the second period of time that a person not classified as an associate is located in one of the subset of locations;

generate an alert indicative of a potential trespassing; and transmit the alert.

16. The apparatus of claim 10, wherein the probability distribution is further indicative of a likelihood of a particular vector representation appearing in a location in the plurality of image frames, and wherein the associate vector representation is a vector representation that appears most often in the plurality of image frames at a particular location.

17. The apparatus of claim 16, wherein the probability model is learned using Gibbs sampling.

18. The apparatus of claim 10, wherein the processor is further configured to:

determine that another person that is not classified as an associate is standing within a threshold distance from the person classified as an associate;

scan images of the another person for an hazardous object and/or violent movements; and generate an alert indicative of a potential crime in response to identify the hazardous object and/or violent movements.

19. A non-transitory computer-readable medium storing computer instructions for computer vision including person classification, wherein the computer instructions are executable by a processor to:

receive, during a first period of time, a plurality of image frames from a camera monitoring an environment;

identify images of persons from each frame of the plurality of image frames;

determine a respective vector representation of each of the images;

generate a probability distribution indicative of a likelihood of a particular vector representation appearing in the plurality of image frames;

identify an associate vector representation by sampling the probability distribution using a probability model, wherein the associate vector representation is a vector representation that appears most often in the plurality of image frames;

receive an image frame from the camera during a second period of time;

determine an input vector representation of an input image identified in the image frame, wherein the input image depicts a person;

compare the input vector representation with the associate vector representation; and classify the person in the input image as an associate in response to determining, based on the comparing, that the associate vector representation corresponds to the input vector representation.

\* \* \* \* \*